United States Patent
Yasumoto et al.

(10) Patent No.: US 9,139,127 B2
(45) Date of Patent: Sep. 22, 2015

(54) VEHICLE-MOUNTED DISPLAY SYSTEM

(71) Applicant: Alpine Electronics, Inc., Shinagawa-ku, Tokyo (JP)

(72) Inventors: Takashi Yasumoto, Iwaki (JP); Taku Oikawa, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 64 days.

(21) Appl. No.: 14/173,386

(22) Filed: Feb. 5, 2014

(65) Prior Publication Data

US 2014/0292828 A1 Oct. 2, 2014

(30) Foreign Application Priority Data

Apr. 2, 2013 (JP) ................................. 2013-076683

(51) Int. Cl.
| | |
|---|---|
| *G06T 11/20* | (2006.01) |
| *G09G 3/00* | (2006.01) |
| *B60Q 1/00* | (2006.01) |
| *G09G 3/36* | (2006.01) |
| *B60K 35/00* | (2006.01) |
| *B60K 37/02* | (2006.01) |
| *G01D 11/30* | (2006.01) |

(52) U.S. Cl.
CPC . *B60Q 1/00* (2013.01); *B60K 35/00* (2013.01); *B60K 37/02* (2013.01); *G09G 3/36* (2013.01); *B60K 2350/1064* (2013.01); *B60K 2350/1072* (2013.01); *B60K 2350/206* (2013.01); *B60K 2350/2091* (2013.01); *B60K 2350/406* (2013.01); *B60K 2350/962* (2013.01); *G01D 11/305* (2013.01)

(58) Field of Classification Search
CPC ................ G09G 3/36; G09G 2380/10; G09G 2360/145; G09G 2320/0252; B60K 2350/1004; B60K 2350/1064; B60K 2350/1068; B60K 2350/1072; B60K 2350/1032; B60K 35/00; B60Q 1/00
USPC ........... 345/32, 87, 108–111; 340/7.55–7.56, 340/691.1–691.6, 688, 525, 441, 996, 340/995.24–995.28; 349/1; 348/148
See application file for complete search history.

(56) References Cited

U.S. PATENT DOCUMENTS

| | | | |
|---|---|---|---|
| 7,236,089 B2 * | 6/2007 | Ono et al. ..................... 340/461 |
| 7,382,237 B2 * | 6/2008 | Stoschek et al. .............. 340/438 |

(Continued)

FOREIGN PATENT DOCUMENTS

| | | |
|---|---|---|
| EP | 2749852 | 7/2014 |
| WO | WO2013/027496 | 2/2013 |

OTHER PUBLICATIONS

I Extended European Search Report EP14161749 dated Jul. 20, 2015, 6 pgs.

*Primary Examiner* — Kent Chang
*Assistant Examiner* — Nelson Rosario
(74) *Attorney, Agent, or Firm* — Brinks Gilson & Lione (57) ABSTRACT

In one embodiment, left and right frame elements are provided in such a manner as to be movable in a horizontal direction. The left frame element has a shape of the left half of a circular ring and the right frame element has a shape of the right half of the circular ring. The frame elements are horizontally positioned away from each other such that the left frame element surrounds the left side of a circular meter image displayed on a display and the right frame element surrounds the right side of another circular meter image displayed on the display. Two frame interpolation part images are arranged and displayed on the display in a form that the two frame interpolation part images couple upper edges of the left and right frame elements to each other and couple lower edges of the left and right frame elements to each other, respectively.

17 Claims, 10 Drawing Sheets

(56) References Cited

U.S. PATENT DOCUMENTS

| | | | |
|---|---|---|---|
| 8,558,681 B2 * | 10/2013 | Nishiyama | 340/438 |
| 8,577,487 B2 * | 11/2013 | Tarte et al. | 700/97 |
| 2013/0038434 A1 * | 2/2013 | Yamada et al. | 340/425.5 |
| 2014/0216329 A1 | 8/2014 | Masuda | |

* cited by examiner

| DISPLAY MODE | DISPLAY OBJECT INFORMATION ||||| FRAME ELEMENT POSITION ||
| | OBJECT NAME | SIZE | POSITION | DISPLAY ATTRIBUTE | LEFT | RIGHT |
|---|---|---|---|---|---|---|
| NORMAL MODE | SPEEDOMETER | (H01, V01) | (x01, y01) | ... | X001 | X002 |
| | TACHOMETER | (H02, V02) | (x02, y02) | ... | | |
| | FUEL GAUGE | (H03, V03) | (x03, y03) | ... | | |
| | THERMOMETER | (H04, V04) | (x04, y04) | ... | | |
| | FRAME INTERPOLATION PART A | (H05, V05) | (x05, y05) | ... | | |
| | FRAME INTERPOLATION PART A | (H06, V06) | (x06, y06) | ... | | |
| BACK CAMERA ADDITION MODE | FUEL GAUGE-EQUIPPED SPEEDOMETER | (H11, V12) | (x11, y11) | ... | X101 | X102 |
| | BACK CAMERA IMAGE | (H21, V22) | (x12, y12) | ... | | |
| NAVIGATION + PLAYER ADDITION MODE | ... | ... | ... | ... | ... | ... |
| NAVIGATION ADDITION MODE | ... | ... | ... | ... | ... | ... |

DISPLAY MODE TABLE

FIG. 3B

| OBJECT NAME | FRAME INTERPOLATION PART B |
|---|---|
| OBJECT NAME | FRAME INTERPOLATION PART A |
| FRAME INTERPOLATION PART IMAGE | |

FRAME INTERPOLATION PART RECORD

FRAME INTERPOLATION PART DATA

VEHICLE-MOUNTED DISPLAY SYSTEM

RELATED APPLICATION

The present application claims priority to Japanese Patent Application Number 2013-076683, filed Apr. 2, 2013, the entirety of which is hereby incorporated by reference.

BACKGROUND

1. Field of the Invention

The present invention relates to a vehicle-mounted display system provided in an instrument panel of a vehicle.

2. Description of the Related Art

A known vehicle-mounted display system provided in an instrument panel of a vehicle is a vehicle-mounted display system that includes two meters arranged next to each other in a horizontal direction and a liquid crystal display arranged between the two meters (for example, Japanese Unexamined Patent Application Publication No. 2012-32209). Each meter of this vehicle-mounted display system is equipped with a meter ring in which a portion of an end on the other meter side is cut away, and, in addition to various pieces of information, an image that connects two meter rings is displayed on the liquid crystal display.

Another known vehicle-mounted display system provided in an instrument panel of a vehicle is a vehicle-mounted display system that includes a liquid crystal display and a meter ring provided in such a manner as to be horizontally movable on a display surface of the liquid crystal display. In this vehicle-mounted display system, an image representing a meter is displayed inside the meter ring arranged at an intended position on the liquid crystal display, and thus the meter equipped with the meter ring at a certain position is able to be represented (for example, Japanese Patent No. 4648681).

In such a vehicle-mounted display system, the number of meters that are able to be represented and are equipped with a meter ring is fixed, and also the shape and size of a meter is substantially limited by the shape and size of the meter ring.

For this reason, it is difficult to represent a meter equipped with a meter ring in many different ways.

An object of the present invention is to provide a vehicle-mounted display system enabling an indicator surrounded by a frame, such as a meter equipped with a meter ring, to be represented in a greater number of different ways,

SUMMARY

In order to achieve the object, an embodiment of the present invention provides a vehicle-mounted display system that displays an information presentation image representing information to be presented to a user and is mounted in a vehicle. The vehicle-mounted display system includes: a display; a plurality of frame elements that are arranged on a display surface of the display and respectively have shapes corresponding to different portions constituting one closed frame; a movement mechanism that moves the frame elements along the display surface of the display; and a control unit that controls positions of the frame elements via the movement mechanism and also controls displays provided by the display. Here, in the control unit, a plurality of display modes is able to be set. When a first display mode among the plurality of display modes is set, the control unit controls the positions of the plurality of frame elements such that the frame elements are positioned away from each other; displays, on the display, frame interpolation part images representing frame portions that couple edges of the plurality of frame elements such that one closed frame is formed of the plurality of frame elements and the frame interpolation part images; and also displays the information presentation image inside the frame formed of the plurality of frame elements and the frame interpolation part images.

In such a vehicle-mounted display system, the plurality of frame elements are preferably capable of moving to a position at which the edges of the plurality of frame elements are brought into contact with each other. When the plurality of frame elements are positioned at the position at which the edges of the plurality of frame elements are brought into contact with each other, one closed frame is preferably formed of only the plurality of frame elements. In the control unit, when a second display mode among the plurality of display modes is set, the positions of the plurality of frame elements may be controlled such that the frame elements are positioned at the position at which the edges of the plurality of frame elements are brought into contact with each other, and the information presentation image may be displayed inside the frame formed of only the plurality of frame elements without displaying the frame interpolation part images.

In these vehicle-mounted display systems, as the plurality of frame elements, there are preferably provided a left frame element that has a shape of a left half of a closed frame and a right frame element that is arranged on a right side of the left frame element and has a shape of a right half of the closed frame. In the movement mechanism, the left frame element and the right frame element are preferably moved in a horizontal direction. In the control unit, when the first display mode is set, positions of the left frame element and the right frame element are preferably controlled such that the left frame element and the right frame element are horizontally positioned away from each other. As the frame interpolation part images, a frame upper interpolation part image that horizontally couples upper edges of the left frame element and the right frame element to each other and a frame lower interpolation part image that horizontally couples lower edges of the left frame element and the right frame element to each other may be displayed on the display such that one closed frame is formed of the left frame element, the right frame element, the frame upper interpolation part image, and the frame lower interpolation part image.

In this case, preferably, the left frame element has a shape of a left half of a circular ring-shaped meter ring and the right frame element has a shape of a right half of the circular ring-shaped meter ring. When the first display mode is set, the control unit may display, on the display, the frame upper interpolation part image and the frame lower interpolation part image such that one closed rounded rectangular frame is formed of the left frame element, the right frame element, the frame upper interpolation part image, and the frame lower interpolation part image.

As described above, in the case where the left frame element has a shape of a left half of a circular ring-shaped meter ring and the right frame element has a shape of a right half of the circular ring-shaped meter ring, in the control unit, when the first display mode is set, as the information presentation image, a first meter image representing a circular meter that is arranged such that a left half of the circular meter is surrounded by the left frame element and a second meter image representing a circular meter that is arranged such that a right half of the circular meter is surrounded by the right frame element may be displayed.

As described above, in the case where the left frame element has a shape of a left half of a circular ring-shaped meter ring and the right frame element has a shape of a right half of the circular ring-shaped meter ring, the left frame element and the right frame element are preferably capable of moving to a position at which upper edges of the left frame element and the right frame element are brought into contact with each other and at which lower edges of the left frame element and the right frame element are brought into contact with each other. When the left frame element and the right frame element are positioned at the position at which the upper edges are brought into contact with each other and at which the lower edges are brought into contact with each other, one closed circular ring-shaped frame is preferably formed of only the left frame element and the right frame element. Also, in the control unit, when a second display mode among the plurality of display modes is set, positions of the left frame element and the right frame element may be controlled such that the left frame element and the right frame element are positioned at the position at which the upper edges are brought into contact with each other and at which the lower edges are brought into contact with each other, and, as the information presentation image, a meter image representing a circular meter that is arranged so as to be surrounded by the circular ring-shaped frame formed of the left frame element and the right frame element may be displayed without displaying the frame upper interpolation part image and the frame lower interpolation part image.

As described above, in the vehicle-mounted display systems including the left frame element and the right frame element, the frame upper interpolation part image and the frame lower interpolation part image may each be an image whose brightness gradually reduces from edges towards a center of the image in the horizontal direction.

In the above-described vehicle-mounted display systems, as the plurality of frame elements, there may be provided an upper left frame element that has a shape of an upper left quarter of a closed frame, a lower left frame element that is arranged at a position which is vertically lower than a position of the upper left frame element and that has a shape of a lower left quarter of the closed frame, an upper right frame element that is arranged at a position which vertically coincides with the position of the upper left frame element and is horizontally more to right than the position of the upper left frame element and that has a shape of an upper right quarter of the closed frame, and a lower right frame element that is arranged at a position which vertically coincides with a position of the lower left frame element and is horizontally more to right than the position of the lower left frame element and that has a shape of a lower right quarter of the closed frame.

In the above-described vehicle-mounted display systems, in the control unit, brightness of the information presentation image may be reduced towards a lower side at a reduction rate that becomes higher towards the lower side, and the information presentation image may be displayed on the display.

According to the above-described vehicle-mounted display systems, movement of frame elements and display of frame interpolation part images enable a certain size and shape of a frame surrounding an information presentation image to be set. Thus, an indicator surrounded by a frame, such as a meter equipped with a meter ring, may be represented in many different shapes and sizes in a natural form exhibiting a sense of unity.

As described above, according to embodiments of the present invention, a vehicle-mounted display system enabling an indicator surrounded by a frame, such as a meter equipped with a meter ring, to be represented in a greater number of different ways may be provided.

BRIEF DESCRIPTION OF THE DRAWINGS

FIGS. 5A-1 to 5A-3 and 5B-1 to 5B-3 illustrate examples of displays provided by the display unit according to the embodiment of the present invention;

FIGS. 6A-1 to 6A-3 and 6B-1 to 6B-3 illustrate examples of displays provided by the display unit according to the embodiment of the present invention;

FIGS. 8A-1, 8A-2, 8B-1, and 8B-2 illustrate examples of other structures of the display unit according to the embodiment of the present invention;

DETAILED DESCRIPTION OF THE PREFERRED EMBODIMENTS

Figure 1:
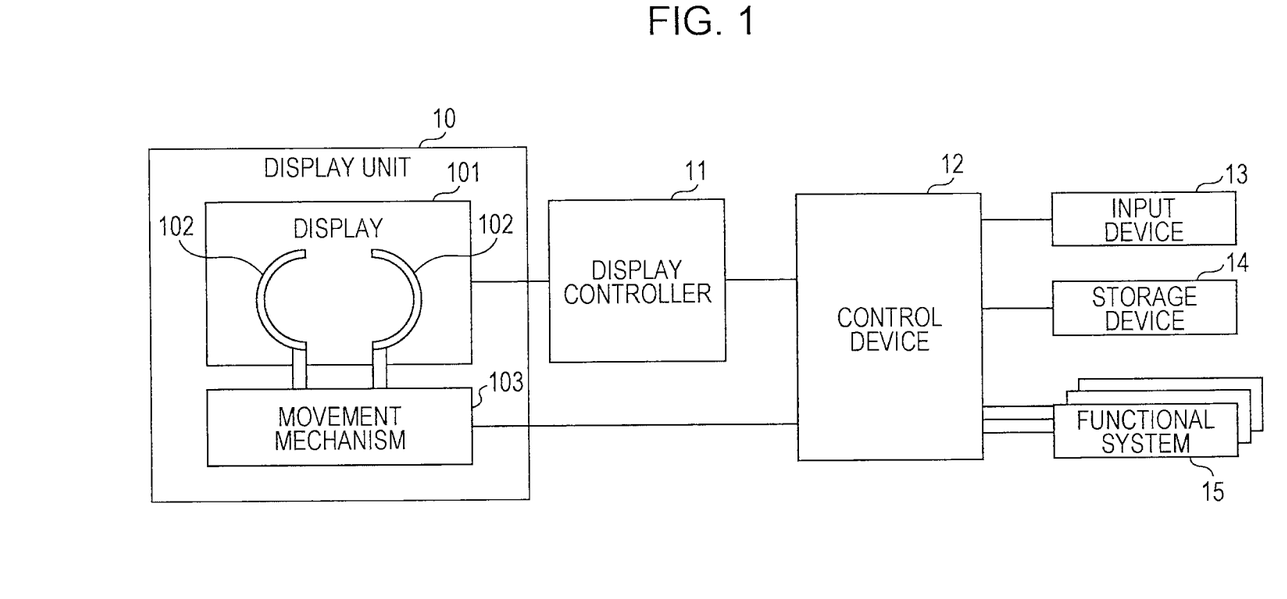
FIG. 1 is a block diagram illustrating the configuration of a vehicle-mounted system according to an embodiment of the present invention.

An embodiment of the present invention will be described below. FIG. 1 illustrates the configuration of a vehicle-mounted system according to the embodiment.

The vehicle-mounted system is a system mounted in a vehicle, and includes a display unit 10 that is constituted by a display 101, two frame elements 102, and a movement mechanism 103, as illustrated in FIG. 1. The vehicle-mounted system also includes a display controller 11 that controls displays provided by the display 101, a control device 12, an input device 13, a storage device 14, and one or more functional systems 15.

Examples of a functional system 15 include a monitoring system that monitors various states of the vehicle, a back camera system that captures an image of the rear of the vehicle with a back camera, an audio-visual (AV) system, and a navigation system. Each system outputs, to the control device 12, a graphical object that specifies an image and a screen to be displayed on the display 101.

Such a vehicle-mounted system may be a system configured by using a computer including a central processing unit (CPU) and a memory. In this case, the functional systems 15 and control device 12, or part thereof may be implemented by the computer executing a certain computer program.

Figure 2A:
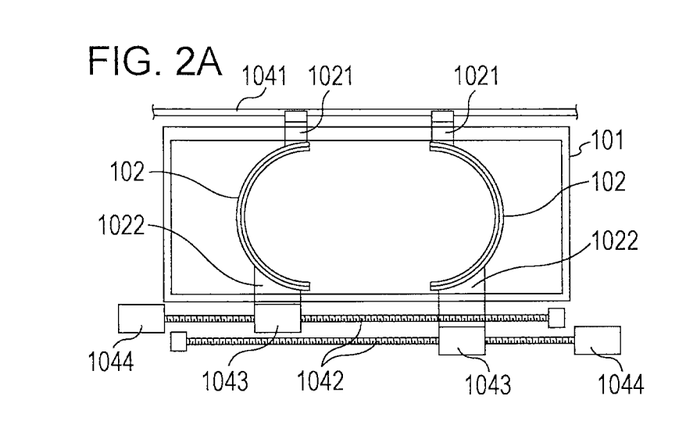
FIGS. 2A to 2D illustrate the structure of a display unit according to the embodiment of the present invention.

Next, FIG. 2A illustrates the structure of the display unit 10. As illustrated in FIG. 2A, the movement mechanism 103 of the display unit 10 includes a guide rail 1041 laid laterally above the display 101 and movement units provided so as to correspond to the respective two frame elements 102.

Each movement unit provided for the corresponding frame element 102 is constituted by a screw 1042, a movement stage 1043 engaged with the screw 1042 in a nut-like manner, and an actuator 1044 that drives the screw 1042 to rotate it, which are arranged below the display 101. The actuator 1044 rotates the screw 1042, so that the movement stage 1043 moves horizontally. The actuator 1044 is configured by using, for example, a servomotor or a stepping motor.

Figure 2B:
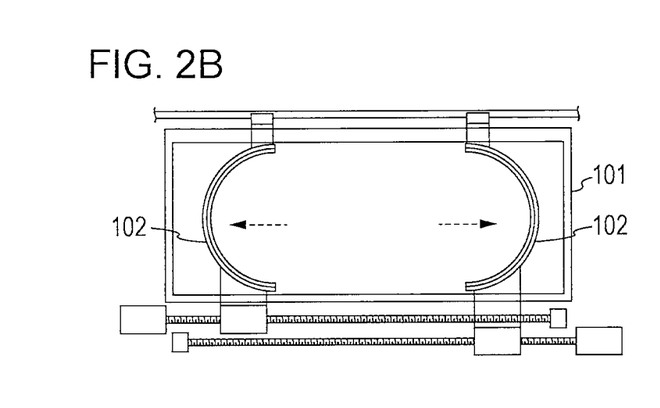

A transparent top coupling member 1021 is fixed to the top of each frame element 102, and a transparent bottom coupling member 1022 is fixed to the bottom of the frame element 102. The bottom coupling member 1022 fixed to the frame element 102 is coupled to the movement stage 1043 of the movement unit corresponding to this frame element 102, and the top coupling member 1021 is slidably installed on the guide rail 1041. Thus, as illustrated in FIGS. 2B and 2C, the frame elements 102 are arranged on a display surface of the display 101 in such a manner as to be able to be moved in a horizontal direction by the movement units.

Figure 2C:
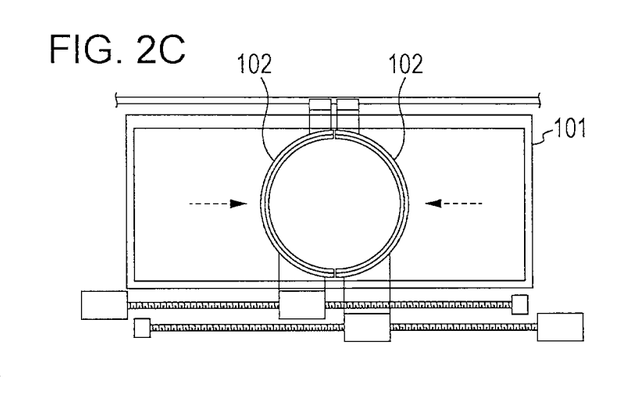
Figure 2D:
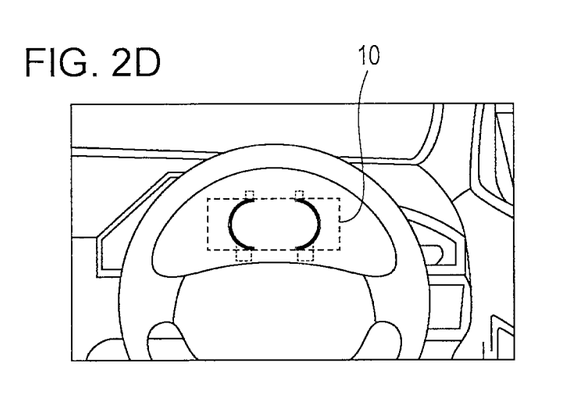

As illustrated in FIGS. 2A to 2D, the two frame elements 102 are semicircular ring-shaped members. The left frame element 102 has a shape of the left half of a circular ring, and the right frame element 102 has a shape of the right half of the circular ring. As illustrated in FIG. 2C, both the frame elements 102 are brought into contact with each other, thereby forming one circular ring-shaped meter ring. As illustrated in FIG. 2D, this display unit 10 is installed in an instrument panel below a meter cluster of the vehicle such that the movement mechanism 103 is concealed.

Figure 3A:
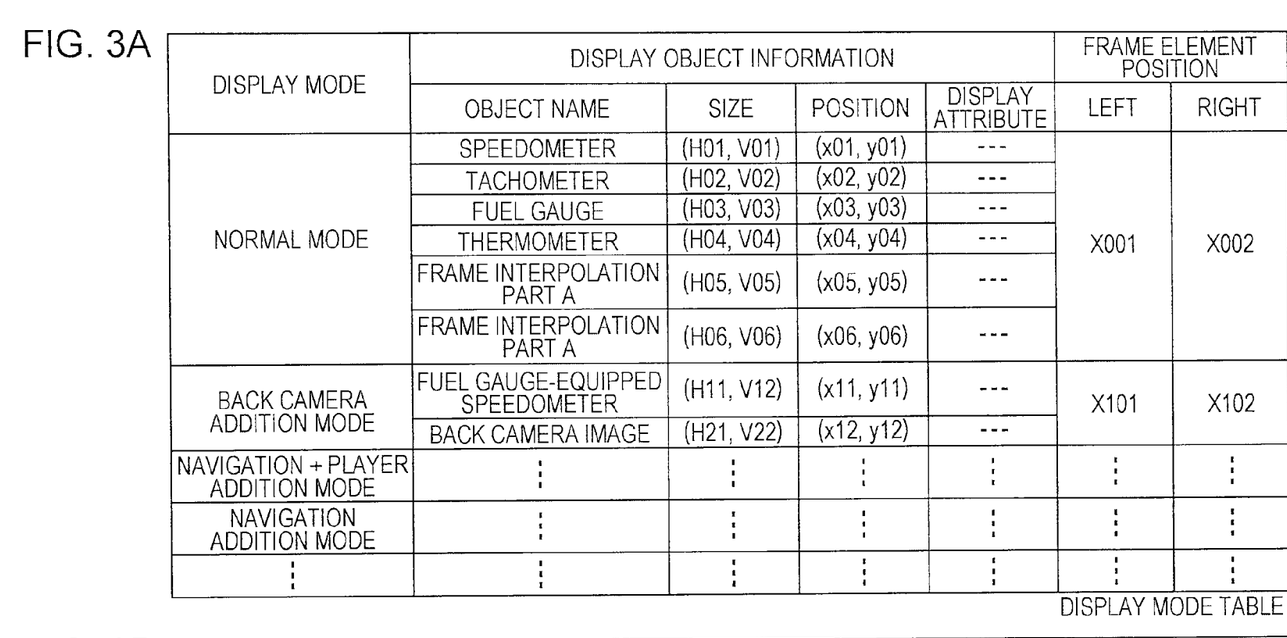
FIGS. 3A and 3B respectively illustrate a display mode table and frame interpolation part data according to the embodiment of the present invention.

Referring back to FIG. 1, a display mode table and frame interpolation part data are stored in the storage device 14 in advance. The vehicle-mounted system has a plurality of display modes. As illustrated in FIG. 3A, in the display mode table, pieces of display object information and frame element positions which correspond to the respective display modes are registered.

In the display object information items, for each of the display objects, which are graphical objects to be displayed on the display 101 when a corresponding display mode is set, there are registered an object name, which is an identifier of the display object, a size at which the display object is to be displayed, a position at which the display object is to be displayed, and display attributes of the display object, such as transparency and a color scheme.

In the display object information items of the display mode table, a graphical object output by each functional system 15 and a frame interpolation part image, which will be described below, may be registered as display objects. In frame element position items, positions at which the left and right frame elements 102 are respectively arranged when a corresponding display mode is set are registered.

Figure 3B:
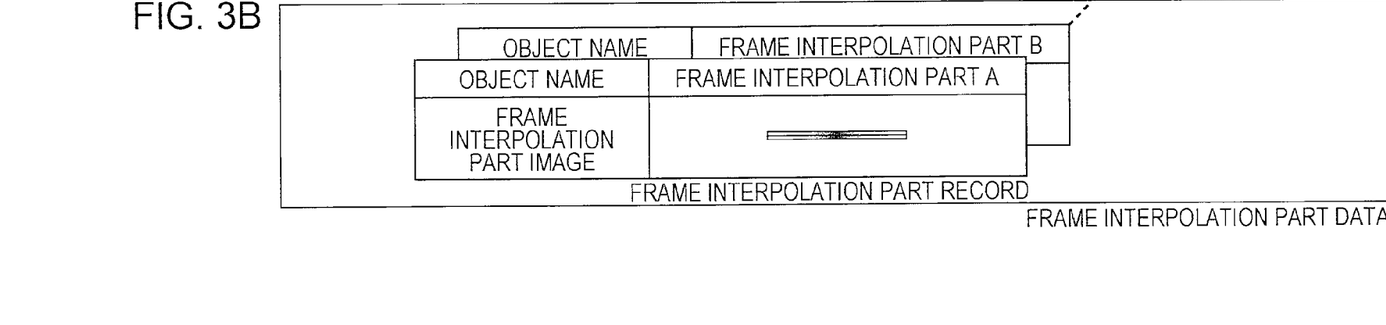

As illustrated in FIG. 3B, in the frame interpolation part data, frame interpolation part records provided for a plurality of frame interpolation part images that have been prepared in advance are registered. In each frame interpolation part record, an object name of a corresponding frame interpolation part image and the corresponding frame interpolation part image are registered. Here, the frame interpolation part image is a graphical object that specifies an image which couples the frame elements 102, which will be described in detail later.

Figure 4:
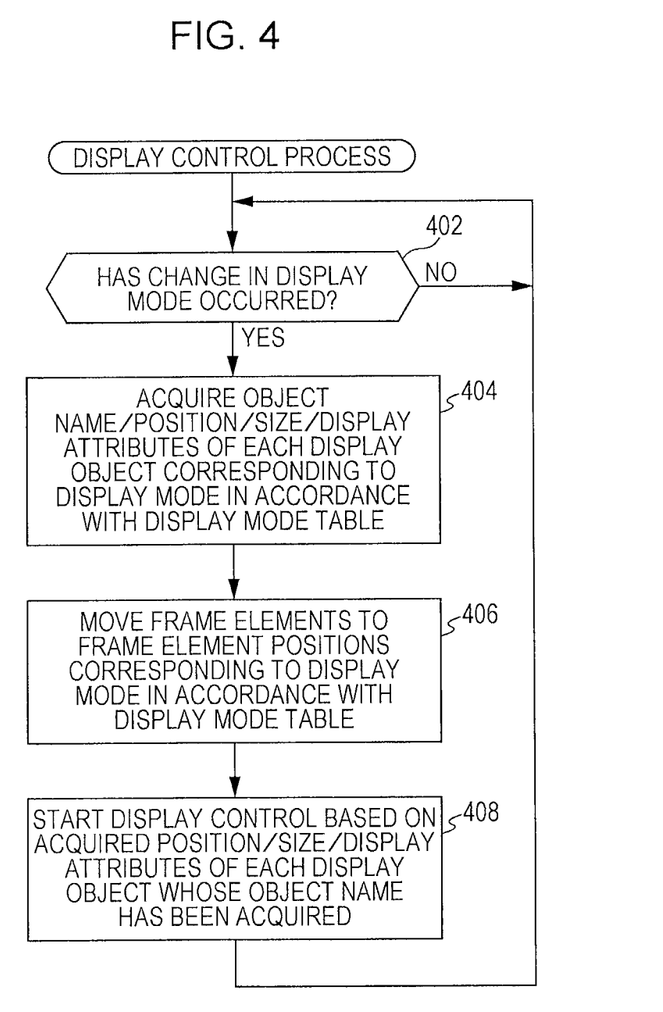
FIG. 4 is a flowchart illustrating a display control process according to the embodiment of the present invention.

Next, in such a configuration, a display control process performed by the control device 12 will be described. FIG. 4 illustrates steps of the display control process.

As illustrated in FIG. 4, the control device 12 monitors a change in display mode (step 402). The control device 12 changes a display mode in response to a display mode switching operation performed by a user via the input device 13 or a change in the state of the vehicle monitored by the monitoring system. When a change in display mode has occurred, an object name, a position, a size, and display attributes of each display object registered in the display object information items in a current display mode of the display mode table are acquired (step 404).

The movement mechanism 103 is controlled so as to move the left and right frame elements 102 to positions registered in the frame element position items in the current display mode of the display mode table (step 406). Subsequently, display control is started on the basis of the acquired size, position, and display attributes of each display object whose object name has been acquired in step 404 (step 408). Then, the process returns to the monitoring process of step 402.

In accordance with the above-described configuration and operation, examples of displays implemented in the embodiment will be described below.

Figure 5A:
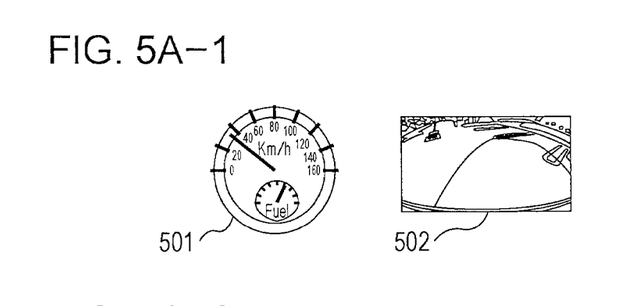
Figure 5A:
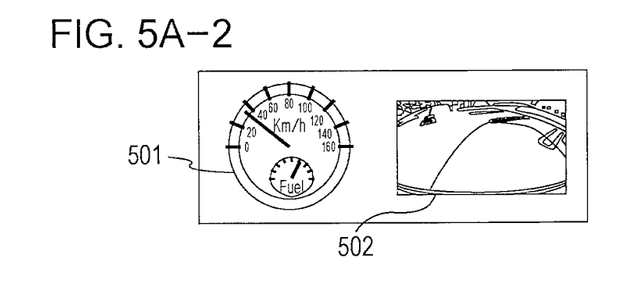
Figure 5A:
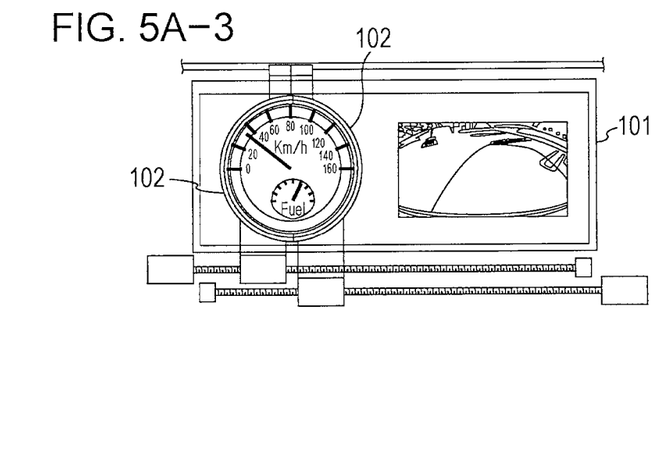

FIGS. 5A-1 to 5A-3 illustrate displays provided when a "back camera addition mode" is set as a display mode.

As illustrated in FIG. 5A-1, in the "back camera addition mode", a circular fuel gauge-equipped speedometer image 501 that represents a speed and a fuel level of the vehicle, which is one of the graphical objects output by the monitoring system, and a back camera image 502, which is one of the graphical objects output by the back camera system, are set as display objects. As illustrated in FIG. 5A-2, an image in which these display objects are arranged is displayed on the display 101. That is, pieces of display object information in the "back camera addition mode" of the display mode table are registered such that the image illustrated in FIG. 5A-2 is defined.

In addition, in the "back camera addition mode", as illustrated in FIG. 5A-3, the left and right frame elements 102 are positioned at positions at which they are coupled so as to surround the fuel gauge-equipped speedometer image 501, thereby forming one circular ring-shaped meter ring. That is, frame element positions in the "back camera addition mode" of the display mode table are registered such that the left and right frame elements 102 are positioned at the positions illustrated in FIG. 5A-3.

Figure 5B:
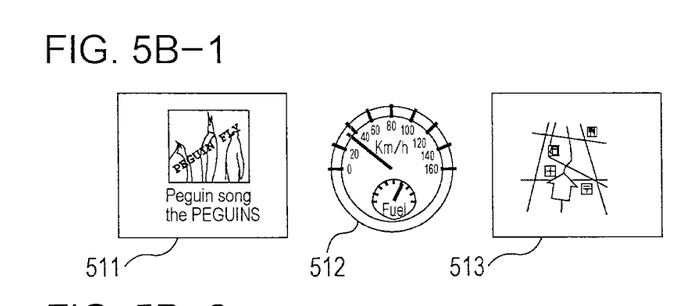
Figure 5B:
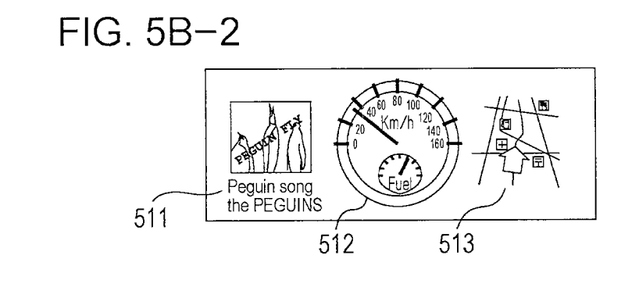

Next, FIGS. 5B-1 to 5B-3 illustrate displays provided when a "navigation +player addition mode" is set as a display mode. As illustrated in FIG. 5B-1, in the "navigation +player addition mode", a music-being-played information screen 511, which is one of the graphical objects output by the AV system, a circular fuel gauge-equipped speedometer image 512, which is one of the graphical objects output by the monitoring system, and a navigation screen 513, which is one of the graphical objects output by the navigation system, are set as display objects. As illustrated in FIG. 5B-2, an image in which these display objects are arranged is displayed on the display 101. That is, pieces of display object information in the "navigation +player addition mode" of the display mode table are registered such that the image illustrated in FIG. 5B-2 is defined.

Figure 5B:
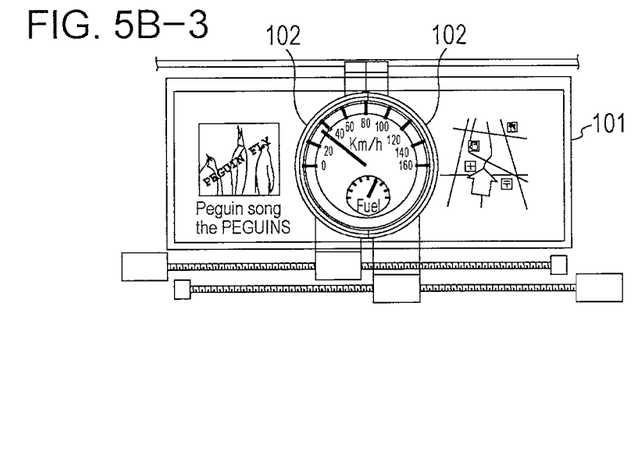

In addition, in the "navigation +player addition mode", as illustrated in FIG. 5B-3, the left and right frame elements 102 are positioned at positions at which they are coupled so as to surround the fuel gauge-equipped speedometer image 512, thereby forming one circular ring-shaped meter ring. That is, frame element positions in the "navigation +player addition mode" of the display mode table are registered such that the left and right frame elements 102 are positioned at the positions illustrated in FIG. 5B-3.

Figure 6A:
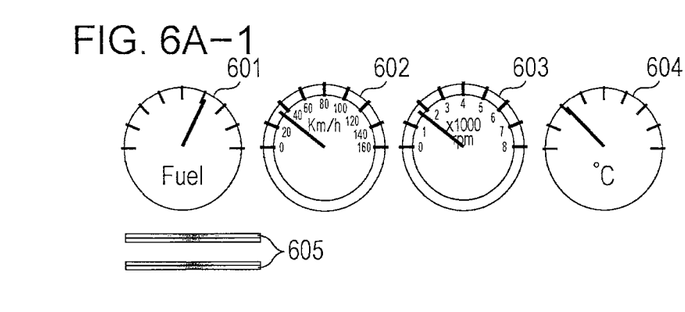
Figure 6A:
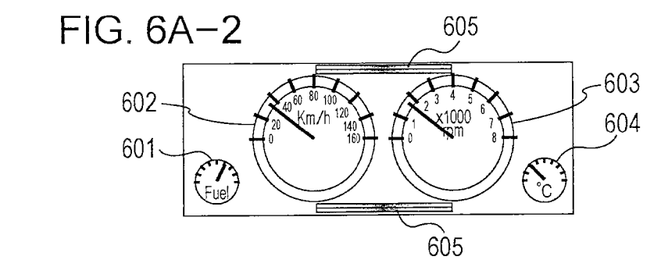
Figure 6A:
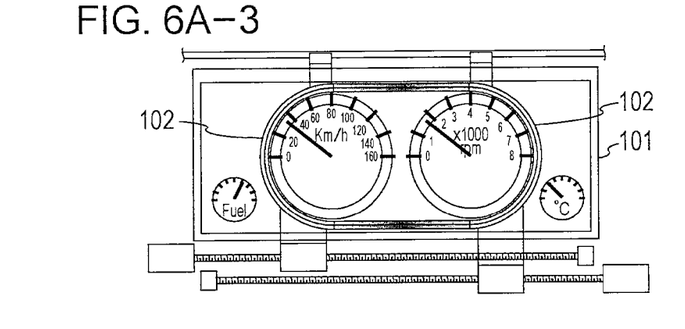

Next, FIGS. 6A-1 to 6A-3 illustrate displays provided when a "normal mode" is set as a display mode.

As illustrated in FIG. 6A-1, in the "normal mode", a fuel gauge image 601, a circular speedometer image 602, a circular tachometer image 603, and a thermometer image 604, all of which are graphical objects output by the monitoring system, and two frame interpolation part images 605 are set as display objects. As illustrated in FIG. 6A-2, an image in which the fuel gauge image 601, the speedometer image 602, the tachometer image 603, and the thermometer image 604 are arranged in this order from the left and in which the two frame interpolation part images 605 are respectively arranged in upper and lower centers of the screen in the horizontal direction is displayed on the display 101. That is, pieces of display object information in the "normal mode" of the display mode table are registered such that the image illustrated in FIG. 6A-2 is defined.

In addition, in the "normal mode", as illustrated in FIG. 6A-3, the left and right frame elements 102 are horizontally positioned away from each other such that the left frame element 102 surrounds the left side of the speedometer image 602 and the right frame element 102 surrounds the right side of the tachometer image 603. That is, frame element positions in the "normal mode" of the display mode table are registered such that the left and right frame elements 102 are positioned at the positions illustrated in FIG. 6A-3.

Now, in the arrangement illustrated in FIG. 6A-3 in which the left and right frame elements 102 are horizontally positioned away from each other, the two frame interpolation part images 605 used in the "normal mode" are arranged and displayed on the display 101 in a form that the two frame interpolation part images 605 couple upper edges of the left and right frame elements 102 to each other and couple lower edges of them to each other, respectively.

Consequently, as illustrated in FIG. 6A-3, the left and right frame elements 102 and the upper and lower frame interpolation part images 605 surround both the speedometer image 602 and the tachometer image 603, thereby naturally representing one rounded rectangular meter ring (constituted by two parallel lines of equal length and two semicircular lines) without causing the user to feel strangeness.

As each frame interpolation part image 605, an image which gradually gets darker towards the center thereof in the horizontal direction is used. This may produce stereoscopic visual effects with which the rounded rectangular meter ring seems to the user to extend out towards the left and right sides and the front.

Figure 6B:
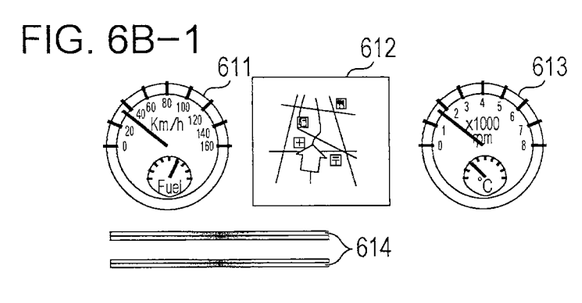
Figure 6B:
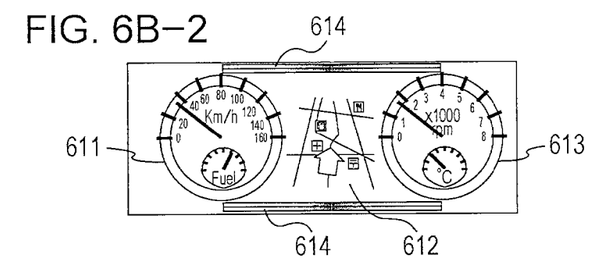
Figure 6B:
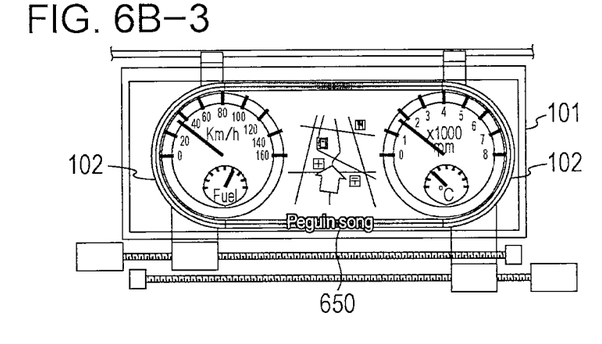

Next, FIGS. 6B-1 to 6B-3 illustrate displays provided when a "navigation addition mode" is set as a display mode.

As illustrated in FIG. 6B-1, in the "navigation addition mode", a circular fuel gauge-equipped speedometer image 611, which is a graphical object output by the monitoring system, a navigation screen 612, which is a graphical object output by the navigation system, a circular thermometer-equipped tachometer image 613, which is a graphical object output by the monitoring system, and two frame interpolation part images 614 are set as display objects. As illustrated in FIG. 6B-2, an image in which the fuel gauge-equipped speedometer image 611, the navigation screen 612, and the thermometer-equipped tachometer image 613 are arranged in this order from the left and in which the two frame interpolation part images 614 are respectively arranged in upper and lower centers of the screen in the horizontal direction is displayed on the display 101. That is, pieces of display object information in the "navigation addition mode" of the display mode table are registered such that the image illustrated in FIG. 6B-2 is defined.

In addition, in the "navigation addition mode", as illustrated in FIG. 6B-3, the left and right frame elements 102 are horizontally positioned away from each other such that the left frame element 102 surrounds the left side of the fuel gauge-equipped speedometer image 611 and the right frame element 102 surrounds the right side of the thermometer-equipped tachometer image 613. That is, frame element positions in the "navigation addition mode" of the display mode table are registered such that the left and right frame elements 102 are positioned at the positions illustrated in FIG. 6B-3.

Furthermore, in the arrangement illustrated in FIG. 6B-3 in which the left and right frame elements 102 are horizontally positioned away from each other, the two frame interpolation part images 614 used in the "navigation addition mode" are arranged and displayed on the display 101 in a form that the two frame interpolation part images 614 couple upper edges of the left and right frame elements 102 to each other and couple lower edges of them to each other, respectively.

Consequently, as illustrated in FIG. 6B-3, the left and right frame elements 102 and the upper and lower frame interpolation part images 614 surround all of the fuel gauge-equipped speedometer image 611, the navigation screen 612, and the thermometer-equipped tachometer image 613, thereby naturally representing one rounded rectangular meter ring (constituted by two parallel lines of equal length and two semicircular lines) without causing the user to feel strangeness.

Here also, as each frame interpolation part image 614, an image which gradually gets darker towards the center thereof in the horizontal direction is used. This may produce stereoscopic visual effects so that the rounded rectangular meter ring seems to the user to extend out towards the left and right sides and the front.

Now, in the case where frame interpolation part images are displayed as illustrated in FIGS. 6A-1 to 6A-3 and 6B-1 to 6B-3, other information 650 may also be displayed on a lower frame interpolation part image as illustrated in FIG. 6B-3. In the illustrated example, as the information 650, the title of music being played, which is output by the AV system, is displayed. In this way, information is displayed on the frame interpolation part image 614, and thus a display including the information that exhibits a sense of unity may be produced.

An embodiment of the present invention has been described hereinabove.

In the embodiment, the brightness of an image generated by arranging display objects as described above is reduced, through image processing or control of driving of the display 101, towards a lower side at a reduction rate that becomes higher towards the lower side, and then the image is displayed on the display 101. Thus, a meter image may be displayed by using visual effects by which an upper portion of a meter seems to extend out towards the front with respect to a lower portion of the meter.

Figure 7:
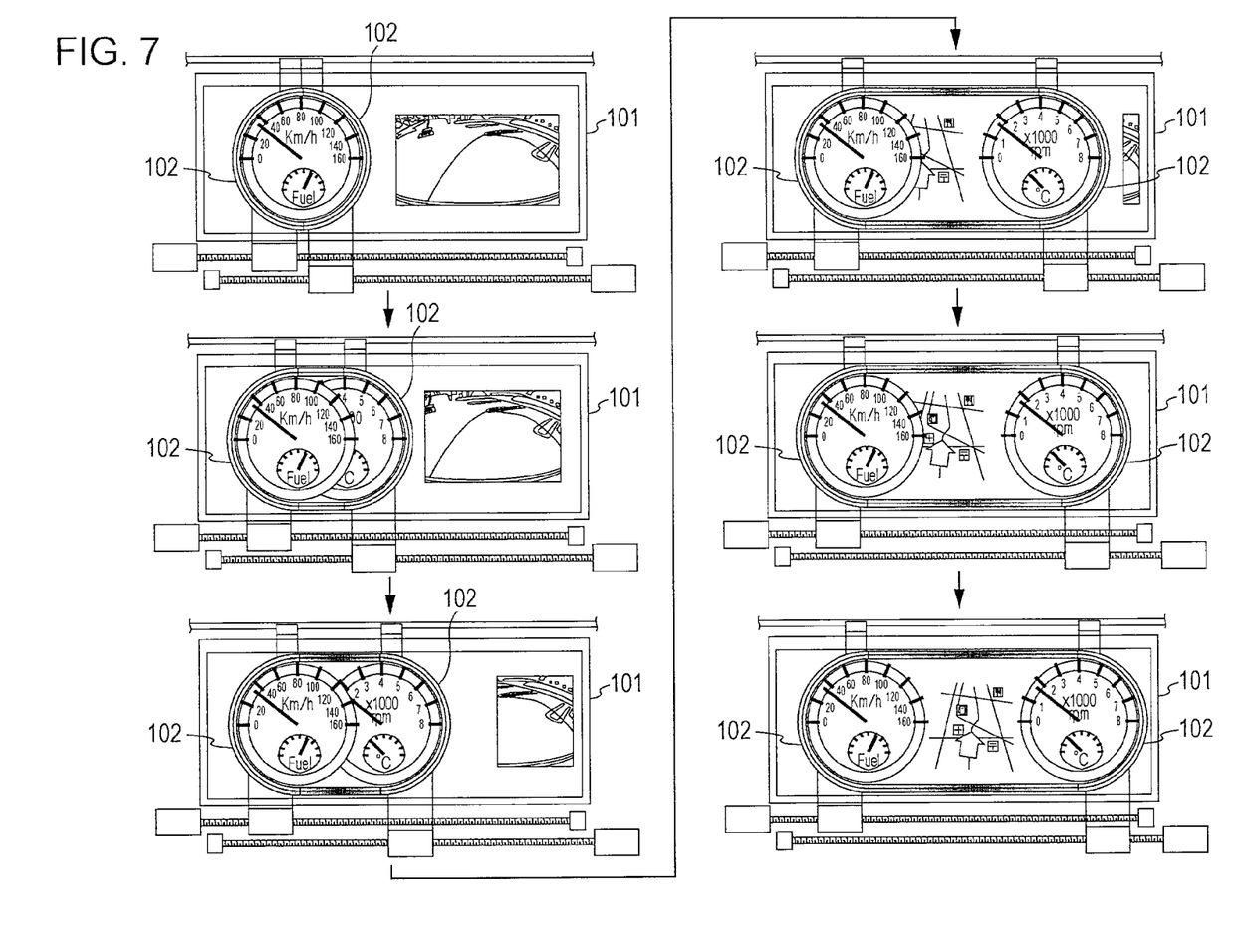
FIG. 7 illustrates examples of displays provided by the display unit according to the embodiment of the present invention.

In the embodiment, display switching performed when a display mode is switched may be performed while applying an appropriate transition effect to the display control process. That is, for example, the control device 12 may control displays provided by the display 101 and movement of the right frame element 102 such that, when switching from the "back camera addition mode" illustrated in FIGS. 5A-1 to 5A-3 to the "navigation addition mode" illustrated in FIGS. 6B-1 to 6B-3 is performed, as illustrated in FIG. 7, the circular ring-shaped meter ring illustrated in FIG. 5A-3 expands in a right direction while pushing the back camera image 502 in the right direction until the rounded rectangular meter ring illustrated in FIG. 6B-3 is formed, and also, with the expansion, the thermometer-equipped tachometer image 613 and the navigation screen 612 are drawn from behind the fuel gauge-equipped speedometer image 501 in the right direction.

Figure 8A:
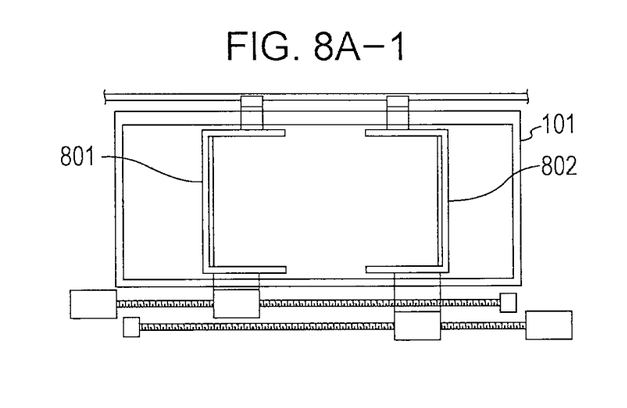
Figure 8A:
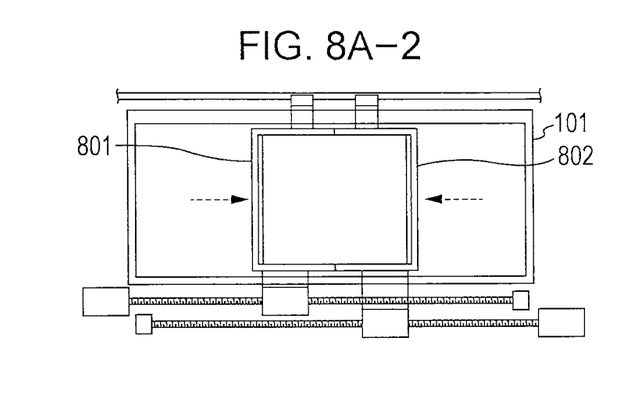

In the embodiment, the semicircular ring-shaped left and right frame elements 102 are used. Alternatively, as illustrated in FIGS. 8A-1 and 8A-2, a left frame element 801 having a shape of the left half of a quadrilateral frame and a right frame element 802 having a shape of the right half of the quadrilateral frame may be used in place of the left and right frame elements 102.

Figure 8B:
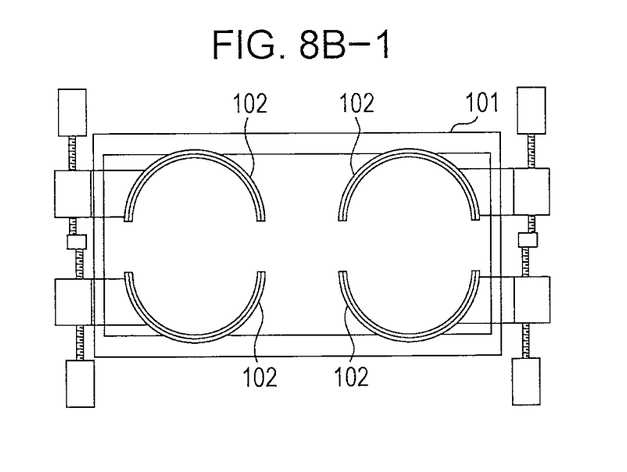
Figure 8B:
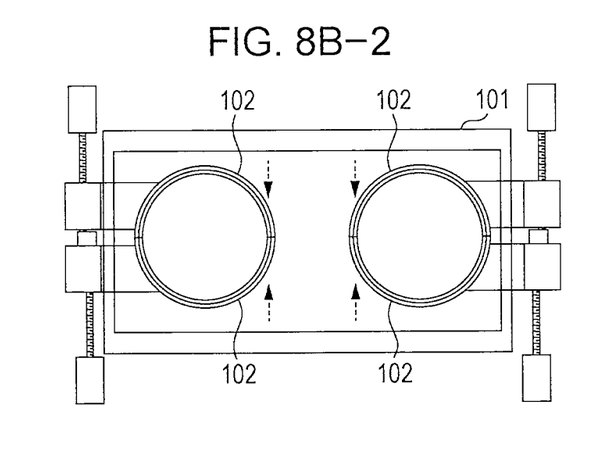

In the embodiment, the left and right frame elements 102 are provided in such a manner as to be movable in the horizontal direction. Alternatively, as illustrated in FIGS. 8B-1 and 8B-2, the frame elements 102 may be arranged on upper and lower sides and vertically moved. In this case, as illustrated in FIGS. 8B-1 and 8B-2, a plurality of sets of the upper and lower frame elements 102 may be provided. In the case where the frame elements 102 are arranged on the upper and lower sides, frame interpolation part images vertically couple left edges of the upper and lower frame elements 102 to each other and vertically couple right edges of them to each other, respectively.

Figure 9A:
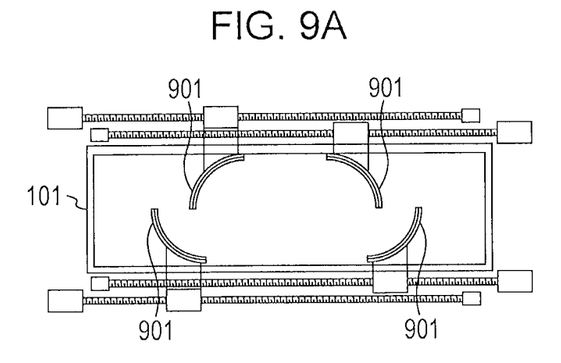
FIGS. 9A and 9B illustrate examples of another structure of the display unit according to the embodiment of the present invention.

In the embodiment, the two semicircular ring-shaped left and right frame elements 102 are used. Alternatively, as illustrated in FIG. 9A, four quarter-circular ring-shaped frame elements 901 on upper, lower, left, and right sides corresponding to the upper left quarter, lower left quarter, lower right quarter, and upper right quarter of a ring may be used in place of the two semicircular ring-shaped left and right frame elements 102. In this case, note that the four quarter-circular ring-shaped frame elements 901 are each provided with the above-described movement unit so that each frame element 901 is independently movable in a horizontal direction.

Figure 9B:
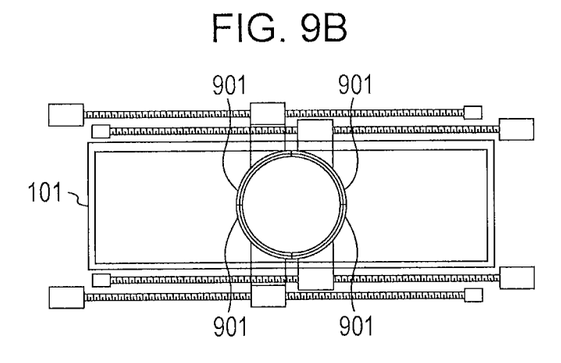
Figure 9C:
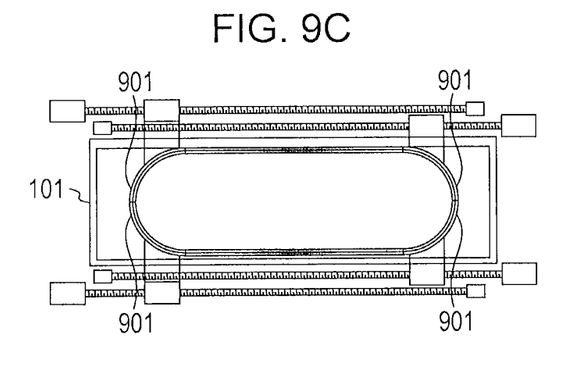
FIG. 9C illustrates an example of a display provided by the display unit.

Thus, even in the case where the four quarter-circular ring-shaped frame elements 901 are used, as in the case where the two semicircular ring-shaped left and right frame elements 102 are used, one circular ring-shaped meter ring may be formed by coupling the frame elements 901 together as illustrated in FIG. 9B, or one rounded rectangular meter ring whose two left and right semicircular portions are formed of the frame elements 901 and whose two upper and lower straight-line portions are formed of frame interpolation part images may be represented as illustrated in FIG. 9C.

Figure 10A:
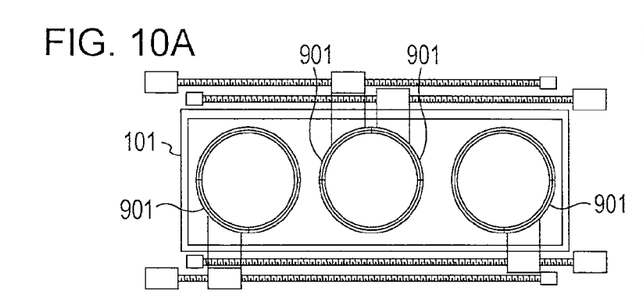
FIGS. 10A to 10F illustrate examples of displays provided by using examples of other structure of the display unit according to the embodiment of the present invention.
Figure 10B:
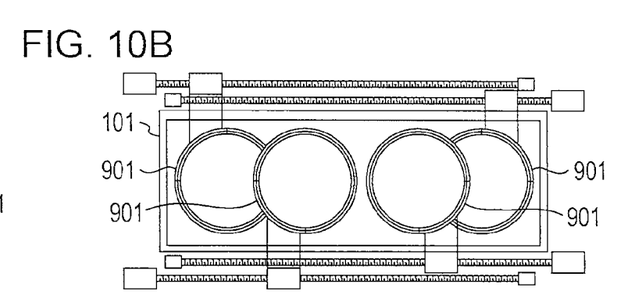
Figure 10C:
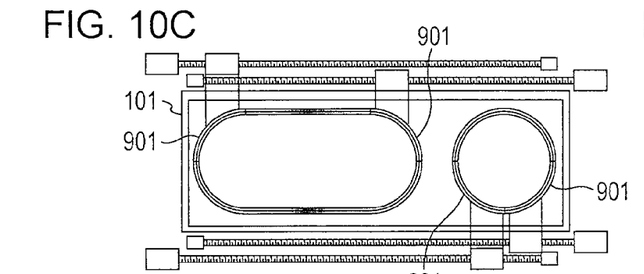
Figure 10D:
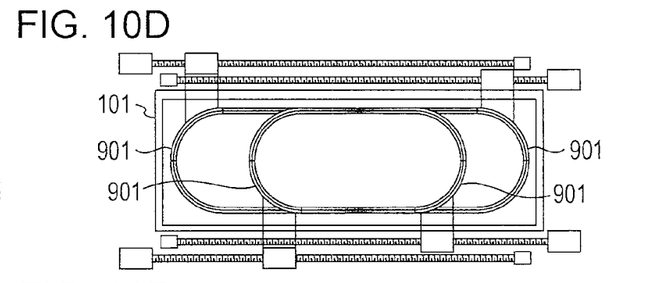
Figure 10E:
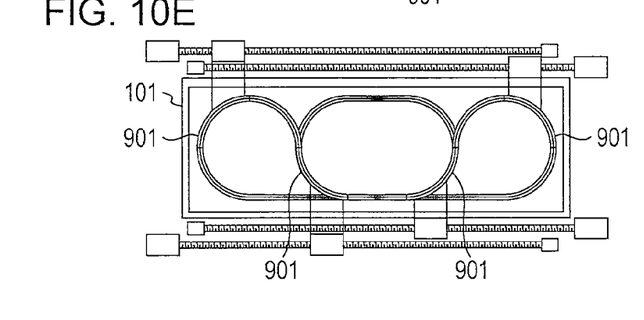
Figure 10F:
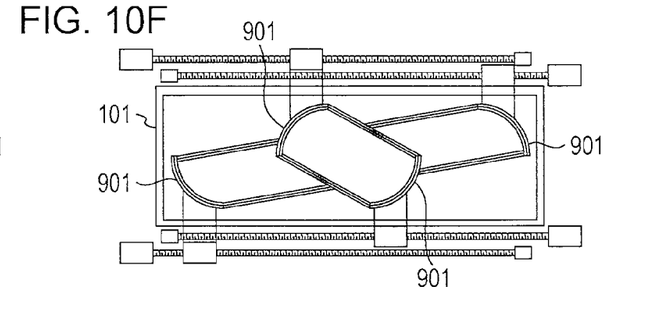

In addition, the four quarter-circular ring-shaped frame elements 901 may be used together with displays of appropriate frame interpolation part images, thereby enabling three circular meter rings illustrated in FIG. 10A, four circular meter rings illustrated in FIG. 10B, one rounded rectangular meter ring and one circular meter ring illustrated in FIG. 10C, or two rounded rectangular meter rings arranged in a nested manner illustrated in FIG. 10D to be represented. Furthermore, the four quarter-circular ring-shaped frame elements 901 may be used together with displays of appropriate frame interpolation part images, thereby enabling meter rings illustrated in FIG. 10E, whose shapes are hard to form with actual meter rings, or irregularly-shaped frames illustrated in FIG. 10F to be represented.

As described above, according to the embodiment, movement of frame elements and display of frame interpolation part images enable a certain size and shape of a frame to be set. Thus, an indicator surrounded by a frame, such as a meter equipped with a meter ring, may be represented in many different shapes and sizes in a natural form exhibiting a sense of unity.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-mounted display system that displays an information presentation image representing information to be presented to a user, the vehicle-mounted display system comprising:
    a display;
    a plurality of frame elements that are arranged on a display surface of the display and respectively have shapes corresponding to different portions constituting one frame;
    a movement mechanism that moves the frame elements along the display surface of the display; and
    a control unit that controls positions of the frame elements via the movement mechanism and also controls a plurality of display modes in the display,
    wherein, when a first display mode among the plurality of display modes is set, the control unit controls the positions of the plurality of frame elements such that the plurality of frame elements are positioned away from each other, displays, on the display, frame interpolation part images representing frame portions that couple edges of the plurality of frame elements such that one frame is formed of the plurality of frame elements and the frame interpolation part images, and also displays the information presentation image inside the frame formed of the plurality of frame elements and the frame interpolation part images.

2. The vehicle-mounted display system according to claim 1,
    wherein the plurality of frame elements are capable of moving to a position at which the edges of the plurality of frame elements are brought into contact with each other, and, when the plurality of frame elements are positioned at the position at which the edges of the plurality of frame elements are brought into contact with each other, one frame is formed of only the plurality of frame elements, and
    wherein, when a second display mode among the plurality of display modes is set, the control unit controls the positions of the plurality of frame elements such that the plurality of frame elements are positioned at the position at which the edges of the plurality of frame elements are brought into contact with each other, and displays the information presentation image inside the frame formed of only the plurality of frame elements without displaying the frame interpolation part images.

3. The vehicle-mounted display system according to claim 1,
    wherein, as the plurality of frame elements, there are provided an upper left frame element that has a shape of an upper left quarter of a frame, a lower left frame element that is arranged at a position which is vertically lower than a position of the upper left frame element and that has a shape of a lower left quarter of the frame, an upper right frame element that is arranged at a position which vertically coincides with the position of the upper left frame element and is horizontally more to right than the position of the upper left frame element and that has a shape of an upper right quarter of the frame, and a lower right frame element that is arranged at a position which vertically coincides with a position of the lower left frame element and is horizontally more to right than the position of the lower left frame element and that has a shape of a lower right quarter of the frame.

4. The vehicle-mounted display system according to claim 1,
wherein the control unit reduces brightness of the information presentation image towards a lower side at a reduction rate that becomes higher towards the lower side, and displays the information presentation image on the display.

5. The vehicle-mounted display system according to claim 1,
wherein, as the plurality of frame elements, there are provided a left frame element that has a shape of a left half of a frame and a right frame element that is arranged on a right side of the left frame element and has a shape of a right half of the frame,
wherein the movement mechanism moves the left frame element and the right frame element in a horizontal direction, and
wherein, when the first display mode is set, the control unit controls positions of the left frame element and the right frame element such that the left frame element and the right frame element are horizontally positioned away from each other, and displays, on the display, as the frame interpolation part images, a frame upper interpolation part image that horizontally couples upper edges of the left frame element and the right frame element to each other and a frame lower interpolation part image that horizontally couples lower edges of the left frame element and the right frame element to each other such that one frame is formed of the left frame element, the right frame element, the frame upper interpolation part image, and the frame lower interpolation part image.

6. The vehicle-mounted display system according to claim 5,
wherein the frame upper interpolation part image and the frame lower interpolation part image are each an image whose brightness gradually reduces from edges towards a center of the image in the horizontal direction.

7. The vehicle-mounted display system according to claim 5,
wherein the control unit reduces brightness of the information presentation image towards a lower side at a reduction rate that becomes higher towards the lower side, and displays the information presentation image on the display.

8. A vehicle mounted display system that displays an information presentation image representing information to be presented to a user, the vehicle-mounted display system comprising:
a display;
a plurality of frame elements that are arranged on a display surface of the display and respectively have shapes corresponding to different portions constituting one frame, wherein the plurality of frame elements include a left frame element that has a shape of a left half of a circular ring-shaped meter ring and a right frame element that is arranged on a right side of the left frame element and has a shape of a right half of the circular ring-shaped meter ring;
a movement mechanism that moves the frame elements along the display surface of the display, wherein the movement mechanism moves the left frame element and the right frame element in a horizontal direction; and
a control unit that controls positions of the frame elements via the movement mechanism and also controls a plurality of display modes in the display,
wherein, when a first display mode among the plurality of display modes is set, the control unit controls the positions of the left frame element and the right frame element such that the left frame element and the right frame element are horizontally positioned away from each other, displays on the display, a frame upper interpolation part image that horizontally couples upper edges of the left frame element and the right frame element to each other and a frame lower interpolation part image that horizontally couples lower edges of the left frame element and the right frame element to each other such that one rounded rectangular frame is formed of the left frame element, the right frame element, the frame upper interpolation part image, and the frame lower interpolation part image.

9. The vehicle-mounted display system according to claim 8,
wherein the frame upper interpolation part image and the frame lower interpolation part image are each an image whose brightness gradually reduces from edges towards a center of the image in the horizontal direction.

10. The vehicle-mounted display system according to claim 8,
wherein the control unit reduces brightness of the information presentation image towards a lower side at a reduction rate that becomes higher towards the lower side, and displays the information presentation image on the display.

11. The vehicle-mounted display system according to claim 8,
wherein, when the first display mode is set, the control unit displays, as the information presentation image, a first meter image representing a circular meter that is arranged such that a left half of the circular meter is surrounded by the left frame element and a second meter image representing a circular meter that is arranged such that a right half of the circular meter is surrounded by the right frame element.

12. The vehicle-mounted display system according to claim 11,
wherein the left frame element and the right frame element are capable of moving to a position at which upper edges of the left frame element and the right frame element are brought into contact with each other and at which lower edges of the left frame element and the right frame element are brought into contact with each other, and, when the left frame element and the right frame element are positioned at the position at which the upper edges are brought into contact with each other and at which the lower edges are brought into contact with each other, one circular ring-shaped frame is formed of only the left frame element and the right frame element, and
wherein, when a second display mode among the plurality of display modes is set, the control unit displays, as the information presentation image, a third meter image representing a circular meter that is arranged so as to be surrounded by the circular ring-shaped frame formed of the left frame element and the right frame element without displaying the frame upper interpolation part image and the frame lower interpolation part image.

13. The vehicle-mounted display system according to claim 12,
wherein the frame upper interpolation part image and the frame lower interpolation part image are each an image whose brightness gradually reduces from edges towards a center of the image in the horizontal direction.

14. The vehicle-mounted display system according to claim 12,
wherein the control unit reduces brightness of the information presentation image towards a lower side at a reduction rate that becomes higher towards the lower side, and displays the information presentation image on the display.

15. A vehicle mounted display system that displays an information presentation image representing information to be presented to a user, the vehicle-mounted display system comprising:
a display;
a plurality of frame elements that are arranged on a display surface of the display and respectively have shapes corresponding to different portions constituting one frame, wherein the plurality of frame elements include a left frame element that has a shape of a left half of a circular ring-shaped meter ring and a right frame element that is arranged on a right side of the left frame element and has a shape of a right half of the circular ring-shaped meter ring;
a movement mechanism that moves the frame elements along the display surface of the display, wherein the movement mechanism moves the left frame element and the right frame element in a horizontal direction; and
a control unit that controls positions of the frame elements via the movement mechanism and also controls a plurality of display modes in the display,
wherein, when a first display mode among the plurality of display modes is set, the control unit controls the positions of the left frame element and the right frame element such that the left frame element and the right frame element are horizontally positioned away from each other, displays on the display, a frame upper interpolation part image that horizontally couples upper edges of the left frame element and the right frame element to each other and a frame lower interpolation part image that horizontally couples lower edges of the left frame element and the right frame element to each other such that one rounded rectangular frame is formed of the left frame element, the right frame element, the frame upper interpolation part image, and the frame lower interpolation part image,
wherein the left frame element and the right frame element are capable of moving to a position at which upper edges of the left frame element and the right frame element are brought into contact with each other and at which lower edges of the left frame element and the right frame element are brought into contact with each other, and, when the left frame element and the right frame element are positioned at the position at which the upper edges are brought into contact with each other and at which the lower edges are brought into contact with each other, one circular ring-shaped frame is formed of only the left frame element and the right frame element, and
wherein, when a second display mode among the plurality of display modes is set, the control unit controls positions of the left frame element and the right frame element such that the left frame element and the right frame element are positioned at the position at which the upper edges are brought into contact with each other and at which the lower edges are brought into contact with each other, and displays, as the information presentation image, a meter image representing a circular meter that is arranged so as to be surrounded by the circular ring-shaped frame formed of the left frame element and the right frame element without displaying the frame upper interpolation part image and the frame lower interpolation part image.

16. The vehicle-mounted display system according to claim 15,
wherein the frame upper interpolation part image and the frame lower interpolation part image are each an image whose brightness gradually reduces from edges towards a center of the image in the horizontal direction.

17. The vehicle-mounted display system according to claim 15,
wherein the control unit reduces brightness of the information presentation image towards a lower side at a reduction rate that becomes higher towards the lower side, and displays the information presentation image on the display.

* * * * *